(12) United States Patent
Luthardt (10) Patent No.: US 9,669,284 B2
(45) Date of Patent: *Jun. 6, 2017

(54) SPORTS BOARD HAVING DEFORMABLE BASE FEATURE

(71) Applicant: FLOW SPORTS, INC., San Clemente, CA (US)

(72) Inventor: Eric H. Luthardt, Maple City, MI (US)

(73) Assignee: NIDECKER, S.A., Rolle (CH)

( * ) Notice: Subject to any disclaimer, the term of this patent is extended or adjusted under 35 U.S.C. 154(b) by 231 days.

This patent is subject to a terminal disclaimer.

(21) Appl. No.: 14/053,523

(22) Filed: Oct. 14, 2013

(65) Prior Publication Data

US 2014/0038480 A1    Feb. 6, 2014

Related U.S. Application Data

(63) Continuation of application No. 13/353,190, filed on Jan. 18, 2012, now Pat. No. 8,556,289.

(Continued)

(51) Int. Cl.
*A63C 5/044* (2006.01)
*A63C 5/03* (2006.01)
(Continued)

(52) U.S. Cl.
CPC ............ *A63C 5/03* (2013.01); *A63C 5/044* (2013.01); *A63C 5/075* (2013.01); *A63C 5/122* (2013.01);
(Continued)

(58) Field of Classification Search
CPC ..... A63C 5/03; A63C 5/0417; A63C 5/04252; A63C 5/0428; A63C 5/044; A63C 5/075;
(Continued)

(56) References Cited

U.S. PATENT DOCUMENTS 5,301,965 A    4/1994  Floreani
5,647,784 A    7/1997  Moran
(Continued)

FOREIGN PATENT DOCUMENTS

DE    3441996 A1    6/1985
EP    1702657 A1    9/2006
(Continued)

*Primary Examiner* — J. Allen Shriver, II
*Assistant Examiner* — Steve Clemmons
(74) *Attorney, Agent, or Firm* — Mintz Levin Cohn Ferris Glovsky and Popeo, P.C.

(57) ABSTRACT

Described herein is a sports board for gliding over a surface. The board includes an upper structural layer having an outer surface, a lower structural layer, a core having an upper surface substantially covered by the upper structural layer and a lower surface substantially covered by the lower structural layer. The board also includes a deformable element covered by the core on an upper surface. A first portion of the deformable element protrudes a distance beneath the lower structural layer towards a horizontal plane of the surface underlying the sports board. The board also includes a base element substantially covering the lower structural layer and the deformable element and an edge component positioned at least in part around a perimeter of the base element. At least a portion of the deformable element can deform upon application of an amount of pressure against the base element.

13 Claims, 8 Drawing Sheets

Related U.S. Application Data (60) Provisional application No. 61/434,386, filed on Jan. 19, 2011.

(51) Int. Cl.

| | | |
|---|---|---|
| *B32B 3/30* | (2006.01) | |
| *A63C 5/075* | (2006.01) | |
| *B63B 35/79* | (2006.01) | |
| *A63C 5/12* | (2006.01) | |
| *B32B 9/00* | (2006.01) | |
| *B32B 1/00* | (2006.01) | |

(52) U.S. Cl.
CPC ............... *A63C 5/126* (2013.01); *B32B 1/00* (2013.01); *B32B 3/30* (2013.01); *B32B 9/00* (2013.01); *B63B 35/7906* (2013.01); *A63C 2201/02* (2013.01); *Y10T 428/24521* (2015.01); *Y10T 428/24628* (2015.01)

(58) Field of Classification Search
CPC . A63C 2005/063; A63C 17/01; A63C 17/018; A63C 17/16; A63C 17/26; A63C 2201/02; A63C 2203/20; B63B 35/7906
See application file for complete search history.

(56) References Cited

U.S. PATENT DOCUMENTS

| | | | |
|---|---|---|---|
| 5,788,259 A | 8/1998 | Emig | |
| 6,059,308 A | 5/2000 | Baudin et al. | |
| 6,237,932 B1 | 5/2001 | Zanco et al. | |
| 6,382,658 B1 | 5/2002 | Stubblefield | |
| 6,581,943 B2 * | 6/2003 | Wegener | 280/11.221 |
| 6,604,754 B1 | 8/2003 | Gyr | |
| 6,663,137 B2 | 12/2003 | Karlsen | |
| 6,764,082 B2 * | 7/2004 | Roderick | 280/11.223 |
| 6,886,848 B2 | 5/2005 | Riepler | |
| 7,216,887 B2 * | 5/2007 | Riepler | 280/608 |
| 7,219,916 B2 | 5/2007 | Olson | |
| 7,275,755 B2 | 10/2007 | Marion | |
| 7,445,227 B2 | 11/2008 | Harris, Jr. et al. | |
| 7,500,691 B2 * | 3/2009 | Haas | 280/608 |
| 7,628,419 B2 | 12/2009 | Gogarty | |
| 8,556,289 B2 | 10/2013 | Luthardt | |
| 2002/0130489 A1 | 9/2002 | Peker et al. | |
| 2003/0102651 A1 | 6/2003 | Riepler | |
| 2003/0127831 A1 | 7/2003 | Wimbish et al. | |
| 2003/0151215 A1 * | 8/2003 | Stief et al. | 280/14.21 |
| 2003/0151229 A1 * | 8/2003 | Muff, Jr. | 280/608 |
| 2006/0043696 A1 | 3/2006 | Trimble et al. | |
| 2007/0114744 A1 | 5/2007 | Mash | |
| 2007/0164522 A1 | 7/2007 | Ellison | |
| 2007/0200317 A1 | 8/2007 | Ellison | |
| 2008/0185815 A1 | 8/2008 | Riepler et al. | |
| 2008/0210374 A1 | 9/2008 | Yatsko | |
| 2009/0058046 A1 | 3/2009 | Harris, Jr. et al. | |
| 2010/0129590 A1 | 5/2010 | Yeh | |
| 2012/0144700 A1 | 6/2012 | Zhao et al. | |
| 2013/0147159 A1 | 6/2013 | Neiley et al. | |
| 2013/0154238 A1 | 6/2013 | Neiley et al. | |
| 2013/0344758 A1 | 12/2013 | Raaphorst | |
| 2014/0059893 A1 | 3/2014 | Neiley | |
| 2014/0239614 A1 | 8/2014 | Neiley et al. | |
| 2014/0291967 A1 | 10/2014 | Neiley et al. | |
| 2014/0291968 A1 | 10/2014 | Elkington | |

FOREIGN PATENT DOCUMENTS

| | | |
|---|---|---|
| WO | WO-91/02571 A1 | 3/1991 |
| WO | WO 2013-192099 | 12/2013 |

* cited by examiner

SPORTS BOARD HAVING DEFORMABLE BASE FEATURE

CROSS REFERENCE TO RELATED APPLICATIONS

This application is a continuation of U.S. patent application Ser. No. 13/353,190, titled "Sports Board Having Deformable Base Feature," filed Jan. 18, 2012, that in turn claims priority to U.S. Provisional Patent Application Ser. No. 61/434,386, titled "Sports Board Having Deformable Base Feature" filed Jan. 19, 2011. Priority of the filing date of Jan. 19, 2011, is hereby claimed, and the disclosures of the aforementioned patent applications are hereby incorporated by reference, each in its entirety.

BACKGROUND

In recent years, board-related sports including land sports such as snowboarding, skate boarding, and water or aquatic sports have continued to become increasingly popular, competitive and demanding on both the rider and the equipment. Snowboards, as well as other board sliding devices, can be used to perform jumps and freestyle maneuvers that can be physically dangerous and produce an element of "shock" to the rider. For example, when "grinding" on a half-pipe or rail structure, a rider can jump onto the rail structure while positioned generally transverse to the rail. The rider can slide along the rail using the leading and/or trailing edge of the snowboard to control the speed and angle at which the snowboard traverses the railing. Ideally, the central portion of the snowboard base contacts the rail. However, the edges of snowboards can inadvertently contact the rail and cause a rider to lose his or her balance and fall off the rail. Grinding the edges of the snowboard can also cause damage to the snowboard.

SUMMARY

In view of the foregoing, there is provided herein a deformable, shock-absorbing element for a sport board that prevents inadvertent contact of the edges with rail structures for a safer and more comfortable riding experience. The boards described herein although generally described in the context of snowboards can be used for gliding along a variety of terrains and can be applied to other sports boards, such as snow skis, water skis, wake boards, kite boards, surf boards, skateboards and the like. It should be appreciated that a "board" described herein will refer generally to any of these sorts of boards as well as to other board-type devices which allow a rider to traverse a solid or fluid surface.

In one aspect, there is disclosed a sports board for gliding over a surface. The board includes an upper structural layer having an outer surface and a lower structural layer. In addition, the board includes a deformable element covered by the upper structural layer on an upper surface, wherein a first portion of the deformable element protrudes a distance beneath the lower structural layer. The board also includes a base element substantially covering the lower structural layer and the deformable element and an edge component positioned at least in part around a perimeter of the base element. The deformable element can deform upon application of an amount of pressure against the base element.

The details of one or more embodiments are set forth in the accompanying drawings and the description below.

Other features, objects, and advantages will be apparent from the description and drawings, and from the claims.

DETAILED DESCRIPTION

Figure 1:
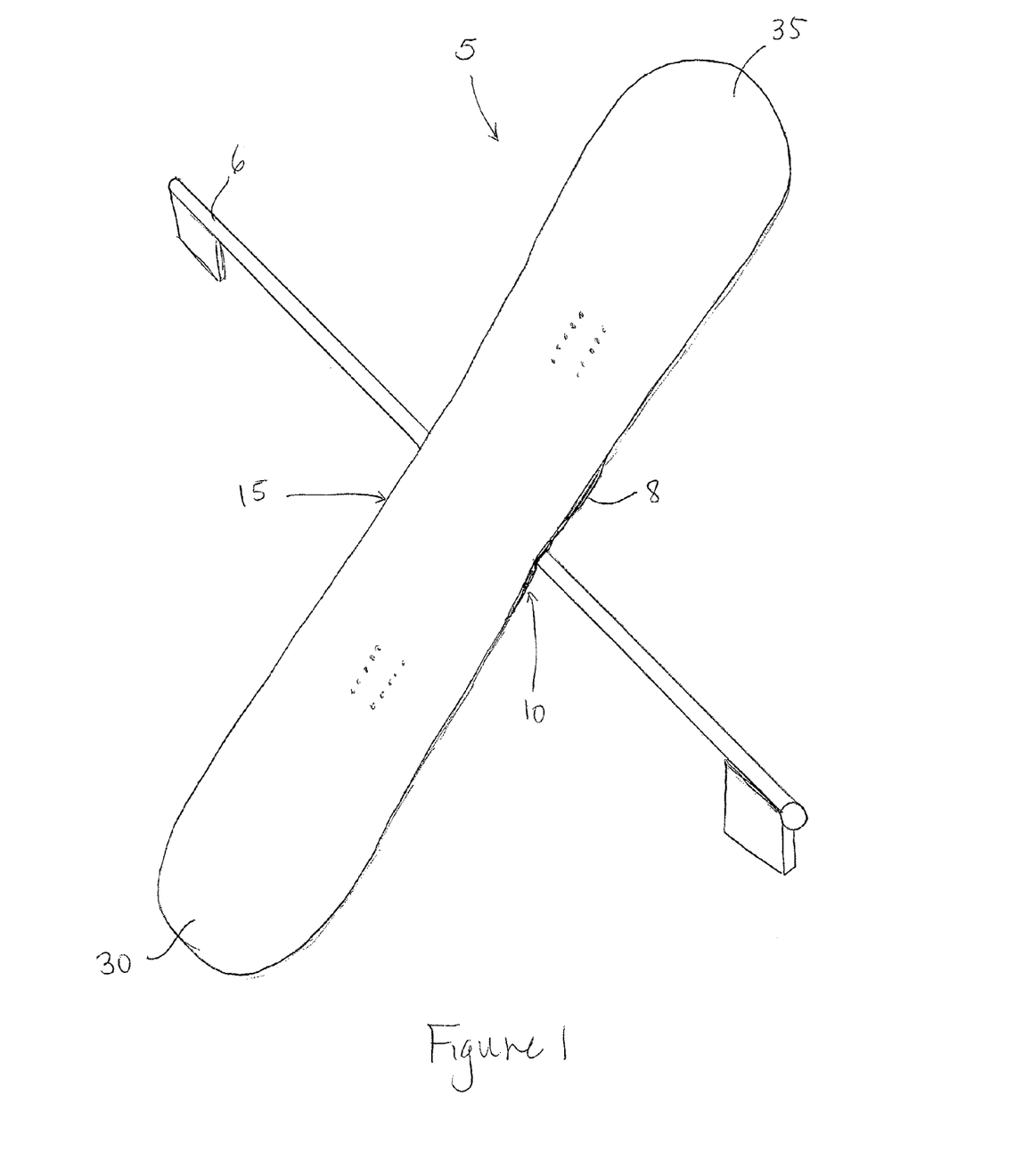
FIG. 1 shows a perspective view of a sports board incorporating a deformable element.

FIG. 1 shows a perspective view of a board 5 in contact with a rail structure 6 and having a deformable element 8 protruding a distance from its bottom surface. A rider typically has an asymmetrical position with respect to the board 5 and with respect to the surface. The rider has two support points on the board 5, and, by a differential action of both boots on the support points, the rider can effect flexural or torsional shape changes to the board 5 to aid in control. When grinding, a rider generally maneuvers the board 5 onto the rail structure 6 while standing on the board 5 such that the board 5 slides along the rail structure 6 while positioned generally transverse to the rail structure 6.

Figure 2A:
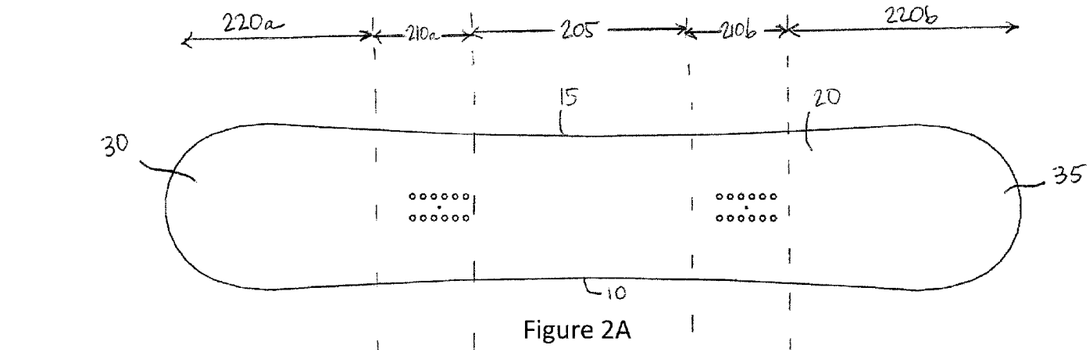
FIGS. 2A, 2B, and 2C show top, bottom and side views, respectively, of the board from FIG. 1.
Figure 2B:
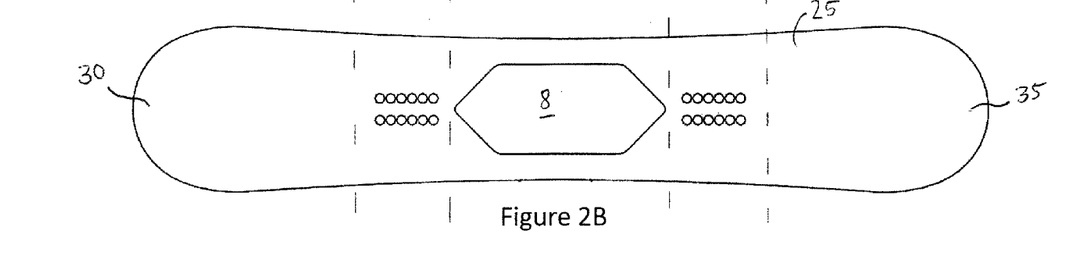
Figure 2C:
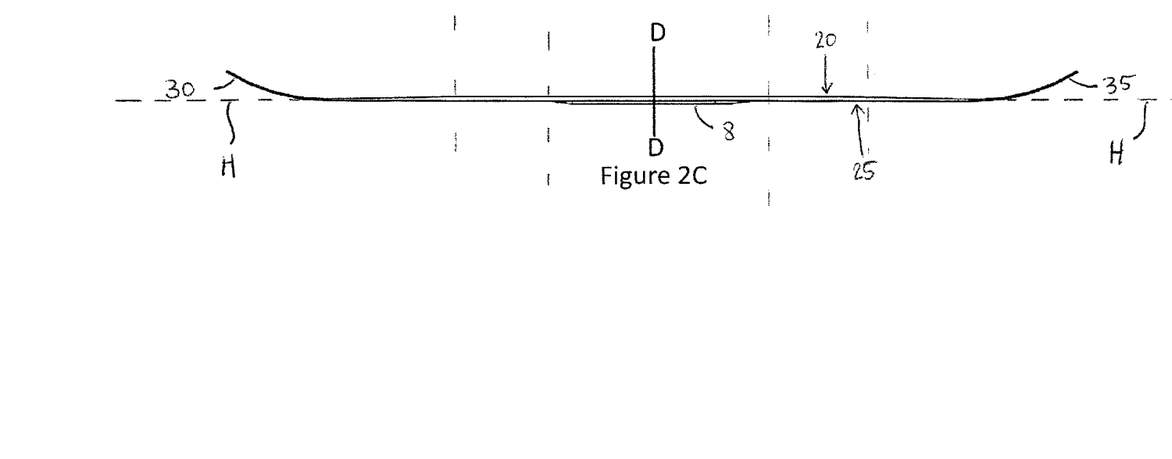

FIGS. 2A, 2B, and 2C show top, bottom and side views, respectively, of the board 5 from FIG. 1. The board 5 can include a top surface 20 (FIG. 2A) and a bottom surface 25 (FIG. 2B) and can generally be divided into a central portion 205 positioned between binding portions 210a, 210b, a rounded front portion 220a including a tip 30, and a rounded back portion 220b including a tail 35. The board 5 can have a width that varies along its length, which can be symmetrical or asymmetrical with respect to a vertical and longitudinal plane. Typically, the width of the board 5 is generally larger near the tip and the tail 30, 35 and tapers inward towards the central portion 205 of the board 5. This results in the board 5 having an overall hour-glass shape, which can facilitate turning and edge grip.

As best shown in FIG. 2C, the tip 30 and tail 35 can be curved upwardly from a horizontal plane H to allow the board 5 to glide over the underlying surface in either a forward or backward direction. The tip 30 and tail 35 can have a tapered thickness. The interface between the leading surface of the tip 30 and the first binding portion 210a as well as the interface between leading surface of the tail 35 and the second binding portion 210b can define a relatively smooth transitional surface or consistent radius. The central portion 205 can be flat or can have a camber or a reverse camber (also called a rocker) as will be discussed in more detail below. The binding portions 210a, 210b can be flat or can have a camber as will be discussed in more detail below. The central portion 205 can have a convex shape from front edge 10 to back edge 15 such that the edges 10, 15 are off the horizontal surface. The thickness of the board 5 along the central portion 205 can be generally thicker than that of the tip and tail 30, 35. This can provide the board 5 with greater stability between the binding attachments while providing improved flexibility proximate the tip and tail 30, 35. In an embodiment, the deformable element 8 positioned beneath the central portion 205 provides an increased thickness to the central portion 205.

Figure 3A:
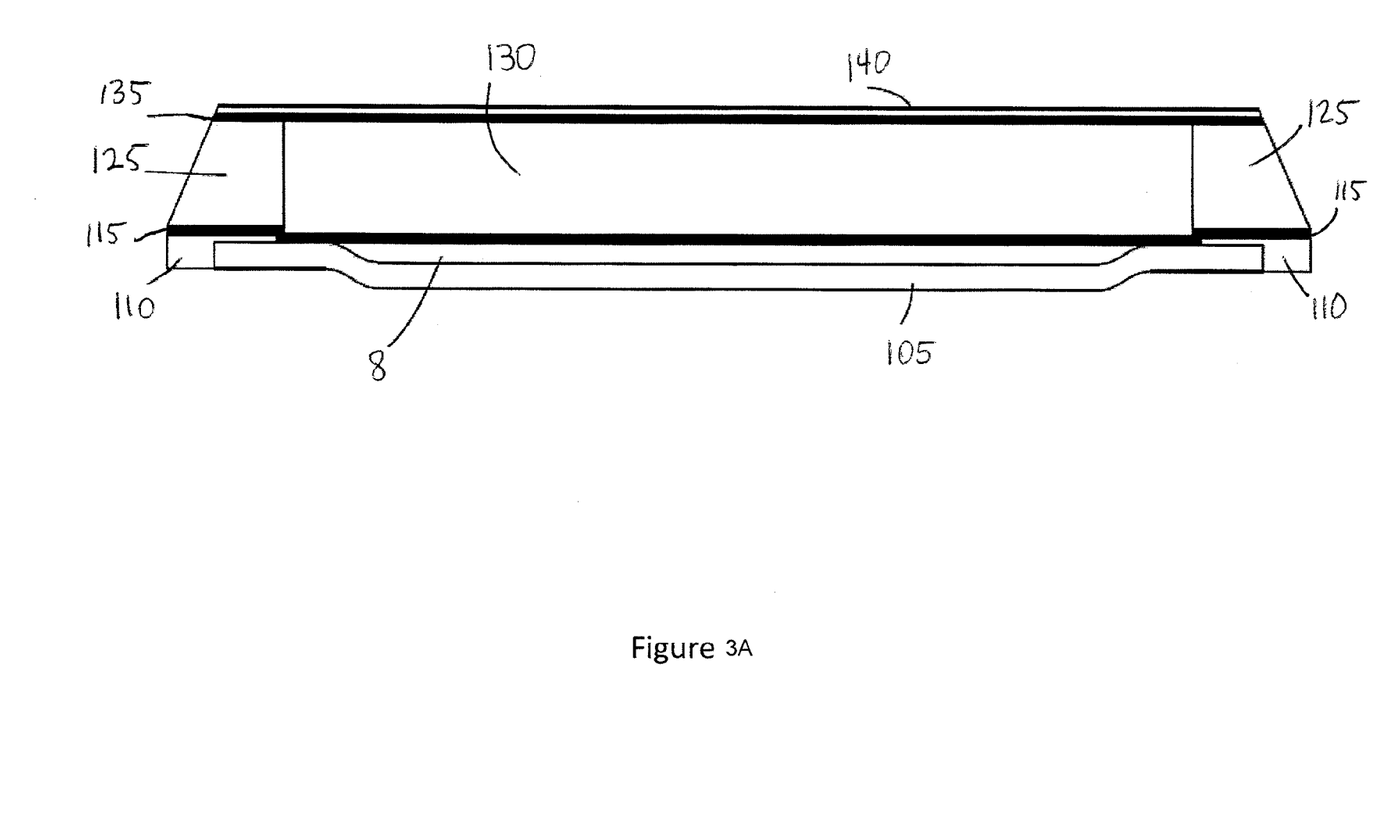
FIG. 3A shows a cross-sectional, schematic view taken along line D-D of FIG. 2C.

FIG. 3A shows a cross-sectional, schematic view taken along line D-D of FIG. 2C. The board 5 can be formed of a number of layers each providing a particular function to the board 5. From the bottom surface 25 of the board 5 is a base layer 105. The base layer 105 can cover nearly the entire bottom surface 25 generally with the exception of the edge component 110. On top of the base layer 105 is a deformable element 8 and on top of the base layer 105 and the deformable element 8 can be a reinforcement layer 115. It should be appreciated that the reinforcement layer 115 can also surround the deformable element 8 (see FIG. 3B). In an embodiment, the reinforcement layer 115 can be fiberglass, carbon, Kevlar® (para-aramid synthetic fibers), basalt, spectra, hemp, bamboo or other material or composite. In an embodiment, the reinforcement layer 115 is a laminate fiber-reinforced polymer composite material in which the reinforcing fibers of the laminae are oriented in any of the following layups: 0/90, 0/30/-30/90, in which the numbers indicate rotation of the reinforcing fibers in degrees in each lamina relative to the laminate coordinate system. The reinforcement layer 115 can be covered by a core/sidewall layer that includes an outer sidewall component 125 and an inner core component 130. The outer sidewall component 125 can extend around at least a portion of the board 5 along the perimeter and form an angle with the edge component 110, which also can surround at least a portion of the board 5 along the perimeter. The core component 130 can typically be formed from a relatively lightweight material that reduces the overall weight of the board 5. The core component 130 can be made of wood, bamboo, plastic, foam, a composite material, fiberglass, carbon fiber, Kevlar®, aluminum, and steel honeycomb or other materials known in the art. The core component 130 can, but need not, include a recess or milled region such that at least a portion of the deformable element 8 can reside within the recess (see FIG. 3B). The core/sidewall layers can be covered by a second reinforcement layer 135 which can then be covered with a top layer 140. The first and second reinforcement layers 115, 135 can be bonded or laminated to the core/sidewall layers 125, 130 and can provide for desired stiffness and torsional rigidity characteristics, and wear characteristics. The base layer 105 and the top layer 140 can be made with material(s) that are wear- and scratch-resistant that can glide along the surface without significant damage. The materials are also generally suitable for filling, shaping, and smoothing to fix edge damage, such as HDPE (high-density polyethylene), UHM-WPE (ultra-high molecular-weight polyethylene), epoxy resin, or the like. The deformable element 8 is sufficiently deformable such that it can flatten to be flush with a plane of the board upon application of an amount of pressure and thus, is not an impediment to finishing the base layer. Further, the top layer 140 can include a top graphic and finish to the board 5. A final laminate can be applied on the riding surface such as polycarbonate or another polymer that is impervious to water, low friction and able to accept wax as a final finish.

The various layers of the board can be bonded together such as by laminating through heat and pressure as is known in the art. The board can be manufactured using "twin plate" approach or "sandwich" or "injection" or "vacuum" methods as are known in the art.

As mentioned above, the base layer 105 covers nearly the entire bottom surface 25 with the exception of the edge component 110. The edge component 110 can be made of a material at least in part that is harder and more resilient than the material from which the sidewall 125 and the base material 105 are made, such as a metal like steel. In an embodiment, the edge component 110 is positioned at least in part around the perimeter of the board 5 to protect the base layer 105 and the first reinforcement layer 115 from becoming damaged due to impact with hard objects. The edge component 110 can also aid in turning the board 5. The edge component 110 can extend along an outside edge and can define an abrupt angle to cut into the surface when performing a turning maneuver.

Because the edge component 110 is generally a harder material than the base layer 105 of the board 5, it can also have a different coefficient of friction compared to the base layer 105 of the board 5. As such, when a rider inadvertently contacts the edge component 110 to a surface, for example a rail structure 6 during a freestyle trick, the board 5 can slip and cause the rider to lose his or her balance and fall. The boards described herein incorporate a deformable element 8 in the bottom surface 25 that helps to prevent such accidents.

Figure 3B:
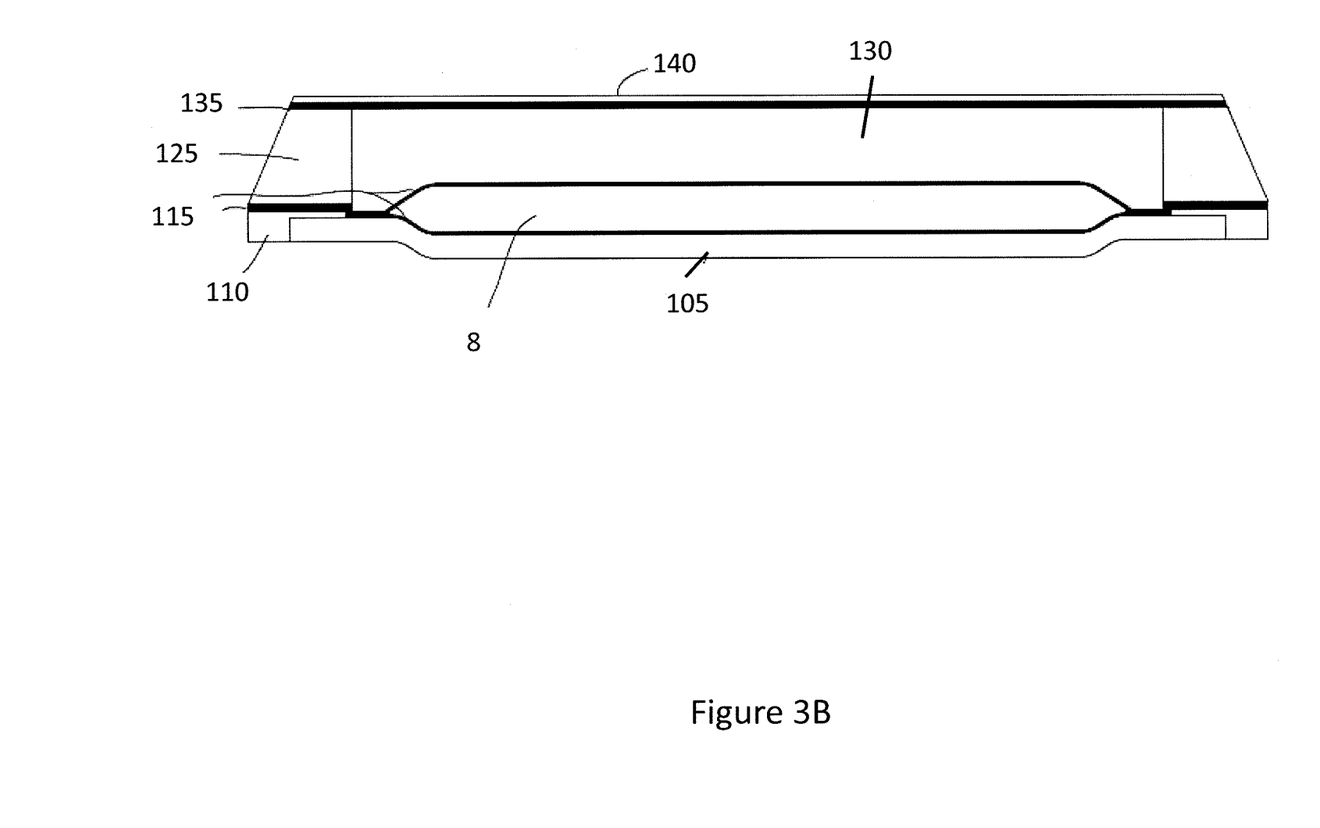
FIG. 3B shows a cross-sectional, schematic view of another embodiment of a board.

As described above, the deformable element 8 can be sandwiched between the base layer 105 and the first reinforcement layer 115 (or as shown in FIG. 3B between two reinforcement layers 115). The deformable element 8 can include a variety of materials such as silicone, foam, rubber, gel, amorphous metal, viscoelastic polymer or other materials or a combination thereof. The deformable element 8 can also be a bladder filled with a material such as a fluid, gas, liquid, gel, solid particulates (e.g. powdered solids or foam beads) or other material or combination thereof. The material used for the deformable element 8 can have a degree of hardness such that it can be deformed, compressed or flattened to a generally planar geometry under an amount of pressure applied. The deformable element 8 can also be deformed such that it maintains a three-dimensional geometry under an amount of pressure applied.

Figure 4A:
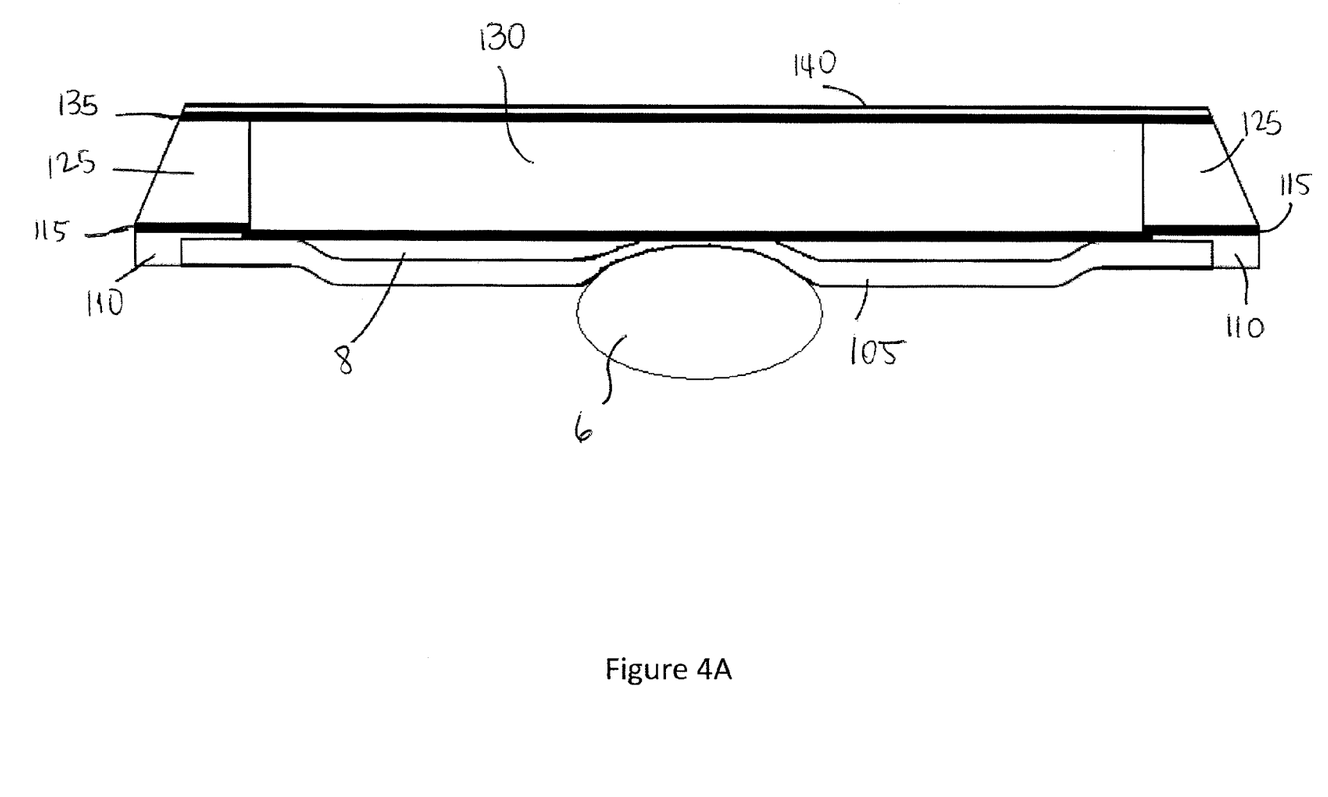
FIGS. 4A-4B show cross-sectional, schematic views of a board illustrating deformation of the deformable element against rail structures.
Figure 4B:
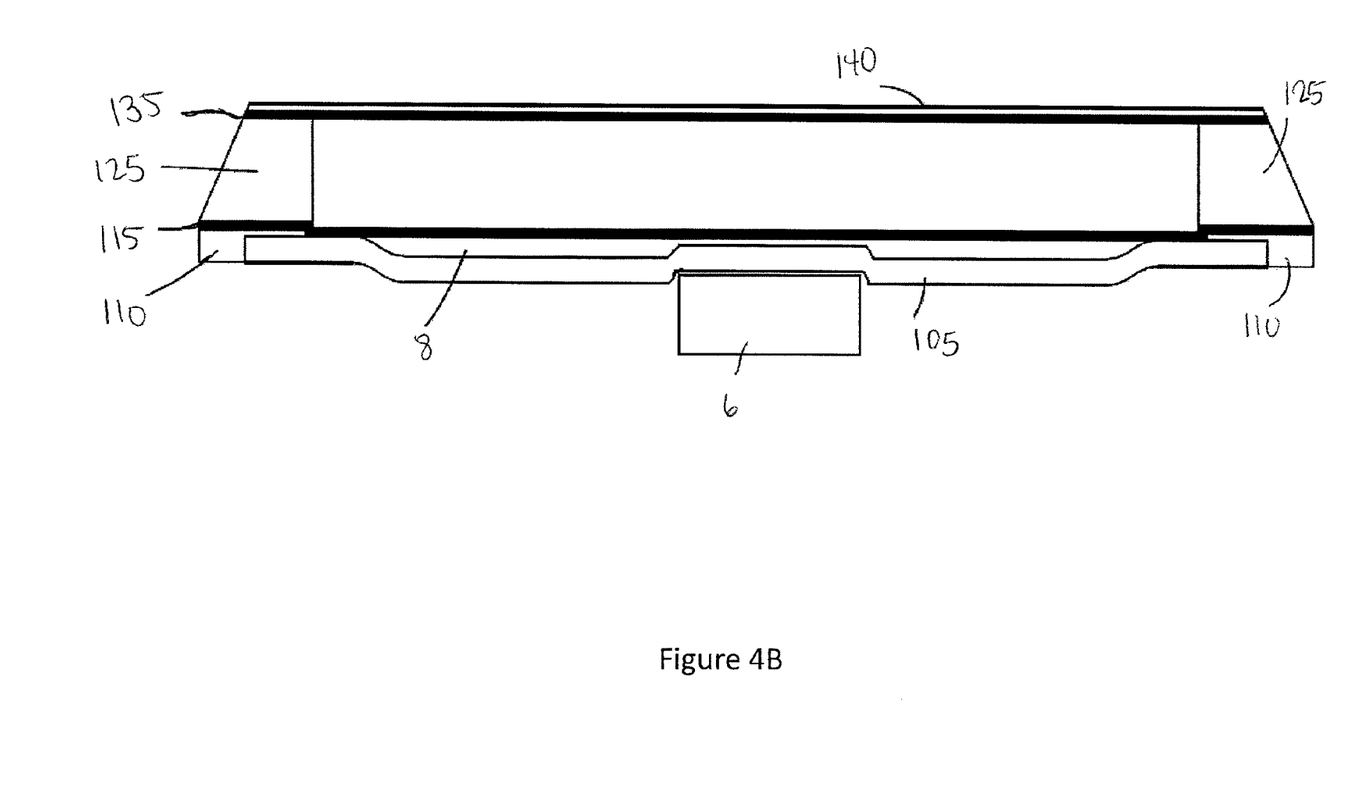

The deformable element 8 can provide various advantages to the board 5 depending upon the properties of the surface on which it is used. In one example, the deformable element 8 can deform less or not at all, such as when used on soft surfaces like powder snow. In this scenario, the bottom surface 25 can maintain a three-dimensional shape that can lessen drag and improve carving. For example, the three-dimensional shape can resemble a boat hull-shape. The three-dimensional shape of the board can also improve the overall speed achieved during a ride on the mountain and prevent the board from wandering or catching an edge during normal riding on a surface. As such, on soft surfaces the board having the three-dimensional projection of the element 8 can create a rocker effect even though the remainder of the board is generally planar. In contrast, the deformable element 8 can flatten or deform, such as when used on harder surfaces like packed or icy snow or when using the board on a half-pipe or other structure (see FIGS. 4A-4B). The deformation of the element 8 can cause the bottom surface 25 of the board 5 to wrap onto, conform to or surround at least a portion of the rail 6 or hard surface. This prevents the edge components 110 of the board 5 from inadvertently contacting and catching the rail structure 6. As such, on harder surfaces the board 5 having the deformable element 8 performs like a camber board. The deformable element 8 improves safety of the ride and can provide a more stable platform and can also increase dampening properties to reduce the feeling of vibrations from hard impacts and riding on hard surfaces.

Figure 5:
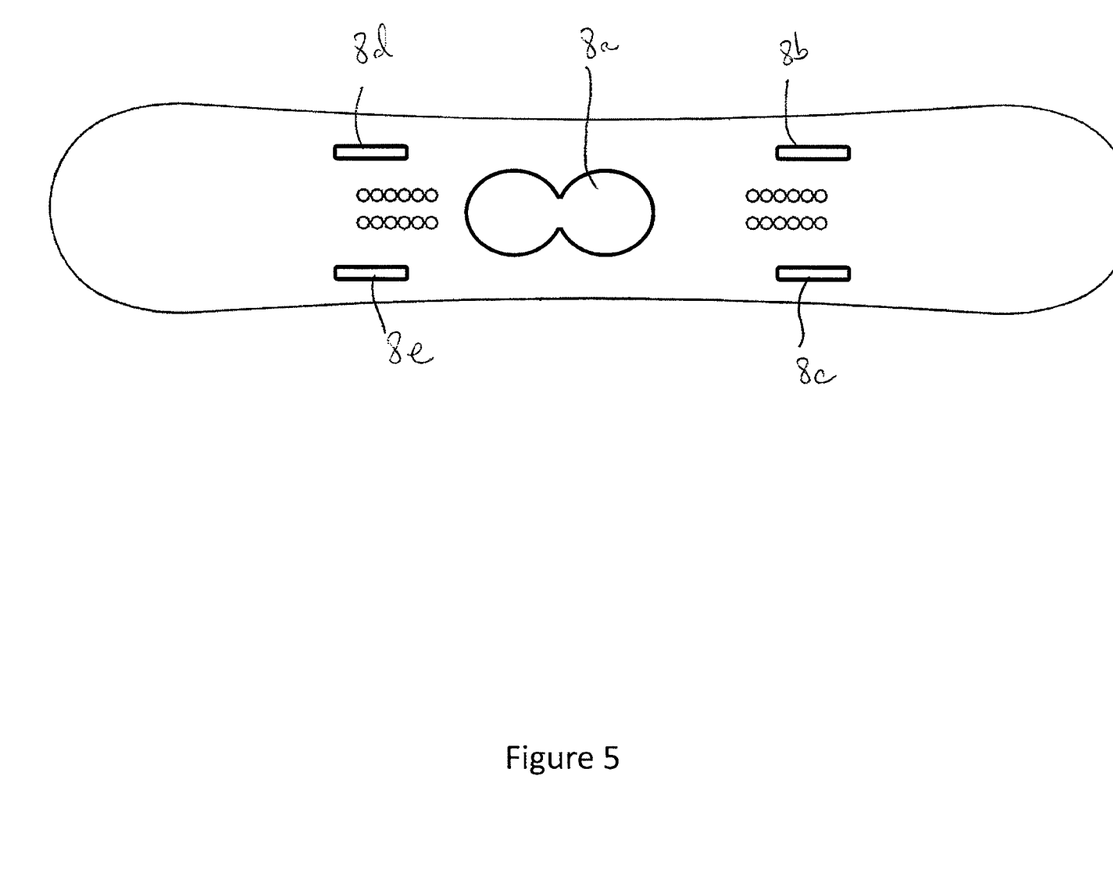
FIG. 5 shows a bottom surface of an embodiment of a board incorporating multiple deformable elements.

The dimensions, position and number of the deformable element(s) 8 incorporated on the board 5 all can vary. Generally, the deformable element 8 is sufficient in size, projection, and flexibility and is appropriate in position relative to the center of the board 5 such that it allows a rider to contact a rail structure 6 with the bottom surface 25 of the board 5 while preventing inadvertent contact of the edge components 110 with the rail structure 6. As shown in FIG. 2B, the deformable element 8 can be positioned within at least the central portion 205 of the board 5 generally between or adjacent one or more binding portions 210a, 210b. The deformable element 8 can also extend beyond the one or more binding portions 210a, 210b or be positioned at other locations on the bottom surface 25 of the board 5 (see FIG. 5, for example). FIG. 5 also shows that the board 5 can incorporate multiple non-contiguous deformable elements 8a, 8b, 8c, 8d, and 8e. The deformable element 8 can have a variety of shapes including, but not limited to hourglass, diamond, circular, rectangular, square, triangular, octagonal, oval, v-shape, U-shape or other shape.

The deformable element 8 can protrude from beneath the board. Generally, the thickness of the deformable element 8 is greater than the thickness of the portion of the deformable element 8 that protrudes. The deformable element 8 can be enclosed between the first and second reinforcement layers 115, 135. As mentioned, at least a portion of the deformable element 8 can be aligned with or positioned within a recess or cavity milled into the lower surface of the core 130 (see FIG. 3B). A second portion of the deformable element 8 can protrude from the recess in the core 130 forming a three-dimensional element on the base of the board. Application of pressure can result in the deformable element 8 compressing. The deformable element 8 can compress to be completely planar or it can retain a three-dimensional shape. It should be appreciated that the core 130 need not include a recess or cavity milled into its lower surface. When pressure is applied to the deformable element 8 it may not compress to be completely planar. In an embodiment, at least a portion of the deformable element 8 can protrude beneath the lower surface of the board towards the horizontal plane of the underlying surface creating a three-dimensional element that protrudes from the lower surface of the board. The element 8 can protrude by at least about 1 mm to about 5 mm when unweighted (i.e. when no pressure is applied to the element 8 from either the board 5 or a surface such as a rail structure 6). In an embodiment, a portion of the deformable element 8 can protrude beneath the board by at least about 2 mm. In an embodiment, at least a portion of the deformable element 8 can deform by approximately 2 mm when a pressure is applied.

As mentioned above, the three-dimensional projection of the deformable element 8 beyond the bottom surface 25 of the board 5 can vary as well. In an embodiment, the deformable element 8 can project such that when deformed upon application of pressure, such as when in contact with a rail structure 6, the bottom surface 25 of the board 5 can form a seat and surround at least a portion of the rail structure 6 conforming to the shape of the structure 6 and providing a gripping function. It should be appreciated that the deformable element 8 need not project from, but can be flush with the bottom surface 25 of the board 5.

Figures 6A, 6B:
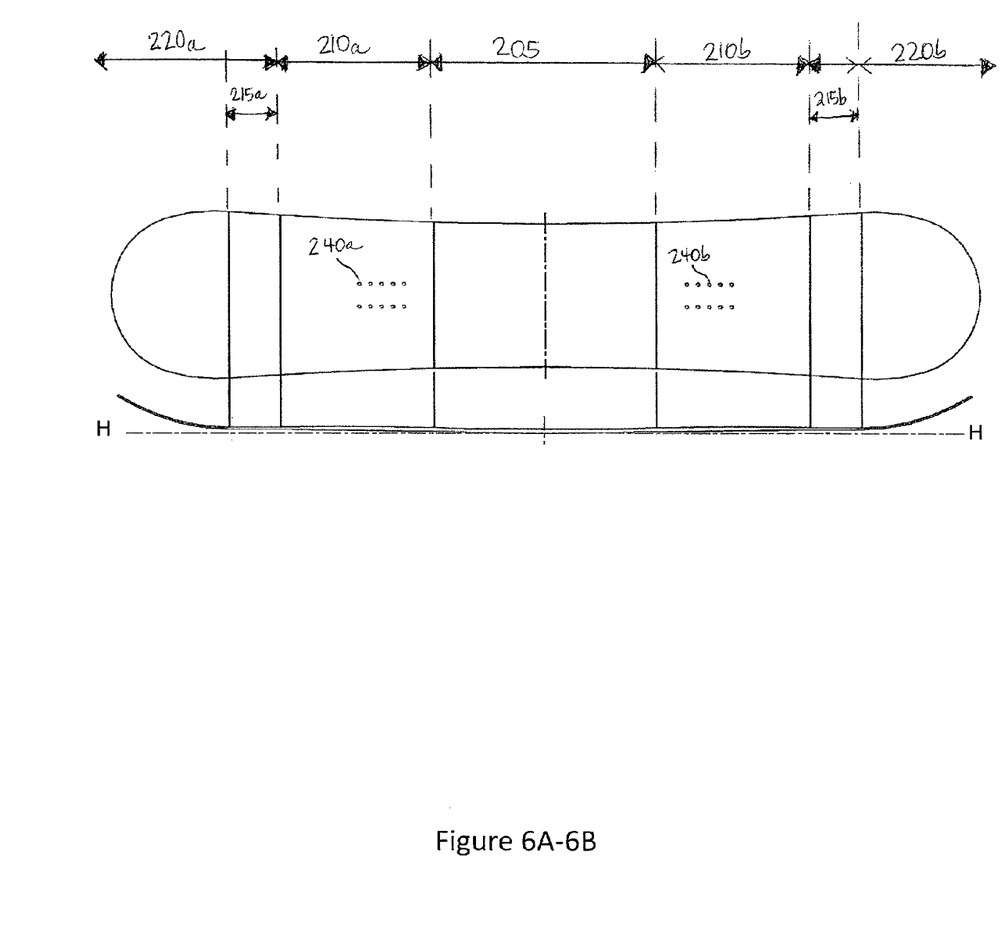
FIGS. 6A-6B show top and side views of an embodiment of a board including a deformable element in the base, a reverse camber and two cambers.

It should be appreciated that the deformable element 8 can be incorporated on a board having a variety of geometries, including a flat board as shown in FIGS. 2A-2C, or a board incorporating one or more camber regions or a board incorporating one or more rocker regions or a combination of camber and rocker regions as shown in FIGS. 6A-6B. As shown in FIGS. 6A-6B, the first and second binding portions 210a, 210b each can include a set of binding mounting holes 240a, 240b on either side of the central portion 205 that allow for boot bindings to be mounted to the board 5. The binding mounting holes 240a, 240b are shown in schematic in the form of circles within the first and second binding portions 210a, 210b. The boot bindings can be moved longitudinally along the board 5 to the extent the binding mounting holes 240a, 240b allow such movement. The binding mounting holes 240a, 240b of the first and second binding portions 210a, 210b can be aligned with a region defining a camber (see FIGS. 6A-6B). Further, the central portion 205 of the board 5 can include a rocker or reverse camber to impart additional board performance benefits to the rider.

The rounded front portion 220a can incorporate a generally planar segment 215a adjacent the first binding portion 210a and the rounded back portion 220b can incorporate a generally planar segment 215b adjacent the second binding portion 210b.

One or more of the rounded front portion 220a, the first binding portion 210a, the rounded back portion 220b and the second binding portion 210b can be above the horizontal plane H when unweighted. When weighted, such as when a rider is standing on the board and depending on the weight of the rider, one or more of these portions can contact the horizontal plane H or can remain elevated above horizontal. In an embodiment, the rounded front portion 220a remains elevated above horizontal H when a rider that is 150 lbs (approximately 63 kg) is on the board 5. In another embodiment, the rounded front portion 220a and the first mounting portion 210a remain elevated above horizontal H when the 150 lb rider is on the board 5. In another embodiment, the rounded back portion 220b remains elevated above horizontal H when the 150 lb rider is on the board 5. In another embodiment, the rounded back portion 220b and the second mounting portion 210b remain elevated above horizontal H when the 150 lb rider is on the board 5. In another embodiment, the rounded front portion 220a and the first mounting portion 210a and the rounded back portion 220b and the second mounting portion 210b remain elevated above horizontal H when the 150 lb rider is on the board 5. The raised sliding surfaces can improve safety with regard to landing after jumping with a board.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Although embodiments of various methods and devices are described herein in detail with reference to certain versions, it should be appreciated that other versions, embodiments, methods of use, and combinations thereof are also possible. Therefore the spirit and scope of the disclosure should not be limited to the description of the embodiments contained herein. It also should be appreciated that although the sport board described herein is frequently described in context of snow and snowboards, that the described technology can be incorporated into other types of sport boards including skis, snow sliding devices, watersport boards such as kiteboards and wakeboards, skateboards and the like.

The invention claimed is:

1. A sports board for gliding over a surface, comprising:
an upper structural layer comprising an outer surface;
a lower structural layer;
a deformable element, wherein a first portion of the deformable element protrudes a distance beneath the lower structural layer;
a base element substantially covering the lower structural layer and the deformable element; and
an edge component positioned at least in part around a perimeter of the base element,
wherein the upper structural layer is disposed above the deformable element, and further wherein the deformable element deforms upon application of an amount of pressure against the base element and the deformable element conforms to a shape of the surface applying the amount of pressure against the base element, the surface comprising a rail structure and the deformable element surrounding at least a portion of the rail structure.

2. The board of claim 1, wherein the outer surface of the upper structural layer comprises a binding portion coupled adjacent a central portion.

3. The board of claim 2, wherein the deformable element is aligned at least in part with the central portion of the upper structural layer.

4. The board of claim 1, wherein the portion of the deformable element that protrudes is at least about 1 mm to about 5 mm thick when the board is unweighted.

5. The board of claim 1, wherein the deformable element deforms by approximately 2 mm when the amount of pressure is applied.

6. The board of claim 1, further comprising a core positioned between the upper structural layer and the lower structural layer, wherein a lower surface of the core comprises a recess, and wherein a second portion of the deformable element resides within the recess.

7. The board of claim 6, wherein the deformable element compresses into the recess upon application of an amount of pressure against the base element and approaches a generally planar geometry.

8. The board of claim 1, wherein the board comprises a plurality of non-contiguous deformable elements.

9. The board of claim 1, wherein the deformable element has a shape selected from the group consisting of hourglass, diamond, circular, rectangular, square, triangular, octagonal, oval, v-shape, and U-shape.

10. The board of claim 1, wherein the deformable element comprises a material selected from the group consisting of silicone, foam, rubber, and gel.

11. The board of claim 1, wherein the deformable element comprises a fillable bladder.

12. The board of claim 11, wherein the bladder is filled with a gas, liquid, or gel material.

13. The board of claim 1, wherein the deformable element has dampening properties and reduces the feeling of vibration to a user.

* * * * *